Jan. 7, 1964 S. REISNER 3,116,665
KEY DUPLICATING MACHINE
Filed Dec. 28, 1961 6 Sheets-Sheet 1

FIG. I.

INVENTOR.
SAM REISNER
BY Elliott & Pastoriza
ATTORNEYS

Jan. 7, 1964 S. REISNER 3,116,665
KEY DUPLICATING MACHINE
Filed Dec. 28, 1961 6 Sheets-Sheet 2

INVENTOR.
SAM REISNER
BY *Elliott & Pastoriza*
ATTORNEYS

Jan. 7, 1964  S. REISNER  3,116,665
KEY DUPLICATING MACHINE
Filed Dec. 28, 1961  6 Sheets-Sheet 3

INVENTOR.
SAM REISNER
BY Elliott & Pastoriza
ATTORNEYS

Jan. 7, 1964 S. REISNER 3,116,665
KEY DUPLICATING MACHINE
Filed Dec. 28, 1961 6 Sheets-Sheet 4

INVENTOR.
SAM REISNER
BY Elliott & Pastoriza
ATTORNEYS

Jan. 7, 1964 S. REISNER 3,116,665
KEY DUPLICATING MACHINE
Filed Dec. 28, 1961 6 Sheets-Sheet 5

INVENTOR.
SAM REISNER
BY Elliott & Pastoriza
ATTORNEYS

United States Patent Office 3,116,665
Patented Jan. 7, 1964

3,116,665
KEY DUPLICATING MACHINE
Sam Reisner, Santa Monica, Calif., assignor to OSCO Corporation, a corporation of California
Filed Dec. 28, 1961, Ser. No. 162,667
12 Claims. (Cl. 90—13.05)

This invention relates generally to the manufacture of keys and more particularly to a novel machine for receiving a given key and automatically forming a key constituting a duplicate of the given key.

Present day duplicate key making machines require that several manual operations be carried out in forming a duplicate key. For example, an operator must select the proper key blank corresponding to the type of given key to be duplicated. This key blank is then manually inserted in a suitable clamp means. The given key is similarly locked in another clamp means, usually spaced from the first clamp means. The operator then manually effects movement of a cutting wheel or equivalent device against the key blank by moving a stylus arm secured to the cutting wheel mechanism in and out of the indentations of the given key. Finally, the operator files or effects some type of deburring operation to remove burrs from the duplicate key blank and then unclamps both the original key and duplicate key and hands them to the customer.

The foregoing operation is not only time consuming but requires the presence of an operator to form the duplicate key. As a consequence, the number of locations at which keys may be duplicated are necessarily limited. Further, the time spent by the operator in forming the key is included as a part of the cost so that obtaining duplicate keys is considerably more expensive than the usual mark-up cost of the duplicate key blank itself.

With the foregoing in mind, it is accordingly a primary object of this invention to provide a novel machine which automatically carries out the functions heretofore performed by an operator to provide duplicate keys.

More particularly, it is an object to provide a key duplicating machine which does not require any special operator but rather is operable by the customer himself to the end that keys may be duplicated considerably more rapidly and for considerably less expense than has been possible heretofore.

Another object is to provide a key duplicating machine which is so designed as to be readily located at many different places for convenience of customers in obtaining duplicate keys.

Still another object is to provide a key duplicating machine which will manufacture a key constituting a duplicate of a given key in response to insertion of the given key and of a coin so that an automatic key vending machine is provided.

Briefly, these and many other objects and advantages of this invention are attained by providing a machine including a key receiving means adapted to receive and clamp in a given position a key from which a duplicate is to be made. Cooperating with the key receiving means is a key forming means designed to form a duplicate key by automatically sensing the indentations of the key within the key receiving means.

In the preferred embodiment of the invention, the key forming means includes a key cutting motor means mounted for movement in both aft and fore and transverse directions. Also included is a selecting means for selecting a suitable key blank from a source of key blanks contained within the machine and positioning the same adjacent to the cutting motor means. A stylus structure is mechanically coupled to the key cutting motor means and arranged to engage the indentations in the key inserted in the key receiving means so that the cutting motor will follow the movements of the stylus all in an automatic manner and thus form the desired duplicate key.

The various operations of receiving, selecting, clamping, cutting, and in the preferred embodiment of the invention, deburring, and finally ejecting the completed duplicate key to the customer are carried out by a series of electrical controls in which the completion of one operation triggers the initiation of the next operation through a complete cycle.

In instances in which the machine is to be employed as a key vending machine, a coin receiving structure is included so that the machine can only be actuated in response to reception of a given coin.

In accordance with a feature of this invention, a plurality of different types of key blanks may be duplicated by means of a novel storage and selection system incorporated within the machine.

A better understanding of the invention as well as various further features and advantages will be had by referring to the preferred embodiment thereof as illustrated in the accompanying drawings, in which.

Figure 1:
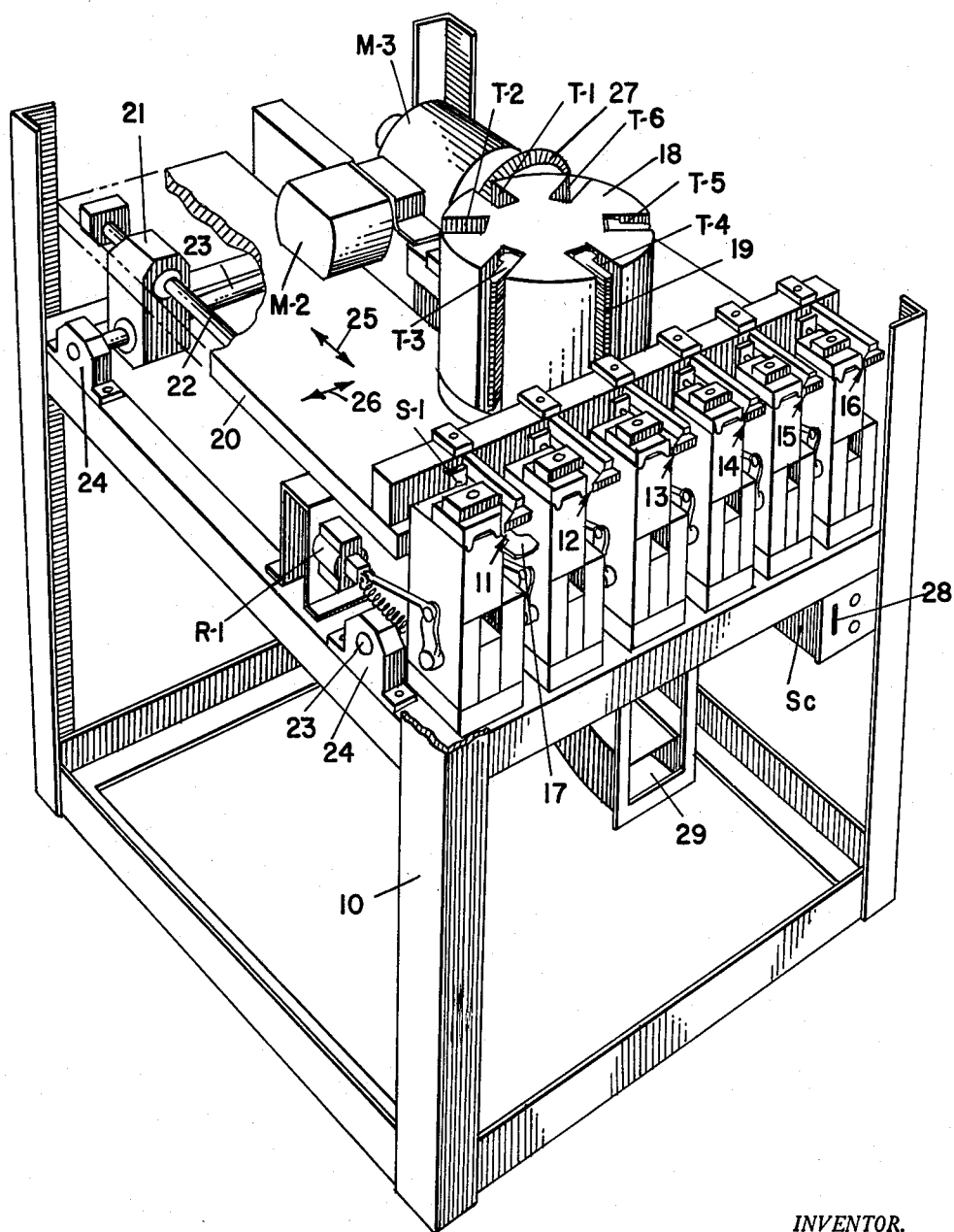
FIGURE 1 is a fragmentary perspective view of the front and left side portions of the machine with the covering housing therefor stripped away to reveal the mechanism.

Referring first to FIGURE 1, there is illustrated a frame structure 10 formed of angle irons as shown. Ordinarily, there would be provided a housing (not shown) for the structure 10 to provide a neat appearance.

As shown on the upper front portion of the frame, there are provided a plurality of key receiving and clamping means 11, 12, 13, 14, 15, and 16 for receiving different types of keys to be duplicated. As a specific example, the various automobile companies, such as General Motors, Ford, Chrysler, American Motors, etc., employ different types of key blanks in designing their automobile keys. The six key receiving and clamping means shown in FIGURE 1 might thus correspond to the various different key types as employed by the automobile companies.

As shown in the first key receiving means, there is disposed a given key 17 to be duplicated.

The various key blanks from which the duplicate key is made are preferably stored in a turret structure 18 shown in the upper center portion of FIGURE 1. This turret structure includes a series of compartments indicated at T-1, T-2, T-3, T-4, T-5, and T-6. The duplicating key blanks themselves are shown at 19. The several groups of key blanks in the various compartments correspond respectively to the various key receiving means 11-16 so that a key blank from one of the compartments in the turret 18 will be selected in response to insertion of a key in a particular one of the key receiving openings corresponding to the group of blank key types in such compartment. The turret structure 18 itself is essentially rotatably mounted to the frame structure 10 to enable a desired selection to be made as will become clearer during the subsequent description.

Movable relative to the frame 10 is a mounting means including a table 20. This table is supported on a carriage means 21 shown in the broken-away portion at the upper left corner of the drawing journalling guide rods 22 secured to the table. Further guide rods 23 are journalled at right angles through the carriage means 21 and secured to end supports 24 in the frame structure 10. The arrangement is such that the table 20 may move in an aft and fore direction with respect to the carriage 21, which in turn may move in a transverse direction with respect to the frame 10 so that the table 20 is essentially capable of both aft and fore movement and transverse movement as indicated by the arrows 25 and 26, respectively.

The table 20 serves to mount a key cutting motor means M-3 carrying a cutter wheel 27. The preferred embodiment also includes a coin receiving structure 28 at the central right portion of FIGURE 1. The arrangement is such that after the key 17 is inserted and a coin received in the slot a suitable selecting means selects a blank key from one of the compartments in the turret 18 and this key is then cut, the cutting wheel being caused to move by movement of the table 20 in accordance with the indentations in the key 17. The completed key is then delivered through a chute 29.

Figure 2:
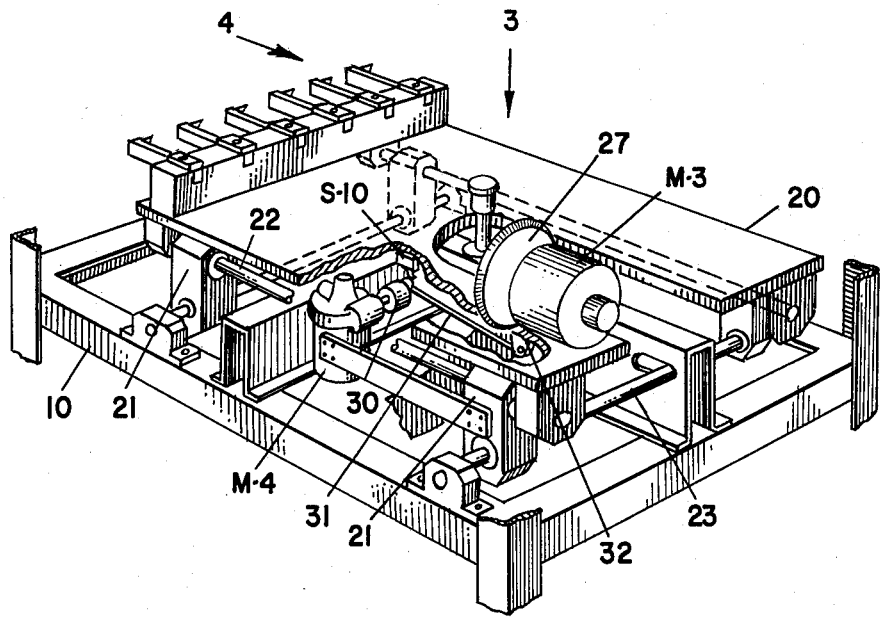
FIGURE 2 is another fragmentary perspective view of the rear right side portion of the machine.
Figure 3:
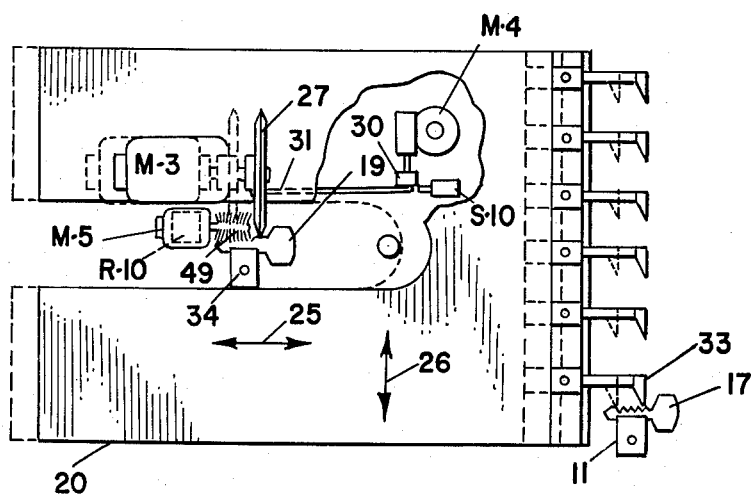
FIGURE 3 is a schematic plan view taken in the direction of the arrow 3 of FIGURE 2.

The manner in which the key cutting wheel 27 and table 20 are caused to move to effect the foregoing operation will be clear by now referring to FIGURES 2 and 3. As shown, a table moving motor M-4 is disposed beneath the table 20 and secured to the carriage means 21. The shaft of this motor passes into a suitable reduction gear to an output shaft terminating in a wheel 30 to which there is pivoted eccentrically thereon a connecting rod 31. The other end of the connecting rod 31 connects at 32 to the under side of the table 20. With this arrangement, one rotation of the wheel 30 will result in an aft and forward movement of the table 20 over a small distance corresponding at least to the length of a key shaft into which indentations are to be cut. A micro-switch S-10 is positioned to be momentarily contacted when the eccentric connection is at its forwardmost point corresponding to the position of the table when in its most forward position as shown in solid lines in FIGURE 3.

The table 20 and cutting motor M-3 are free for transverse movement together and preferably the table 20 is biased such as by gravity by mounting the table at a slight tilt towards the far end of the frame 10 as viewed in FIGURE 2 or by a spring (not shown) so that the cutting wheel 27 will bear against the selected duplicate key blank.

With reference to the plan schematic view of FIGURE 3, there are rigidly secured to the table 20 a plurality of stylii, one of which is shown at 33 positioned to engage the key 17 received within the key receiving and clamping means 11. One of the selected duplicate key blanks 19 is shown secured in a stationary clamping means 34 in proper position for cutting. Transverse motion of the table 20 is controlled by the engagement of the stylus 33 with the various identations in the key 17. Longitudinal or aft and fore movement of the table, however, is effected, as stated, by the motor M-4 shown in FIGURE 2.

With the duplicate key blank 19 clamped in the clamp 34, it will be evident that if the table is biased downwardly as viewed in FIGURE 3, the stylus 33 will be in pressing engagement with the indentations of the key 17. Operation of the table moving motor M-4 of FIGURE 2 will then cause the motor M-3 and cutting wheel 27 to move between the solid and dotted line positions shown so that identical indentations will be cut in the duplicate key 19.

Figure 4:
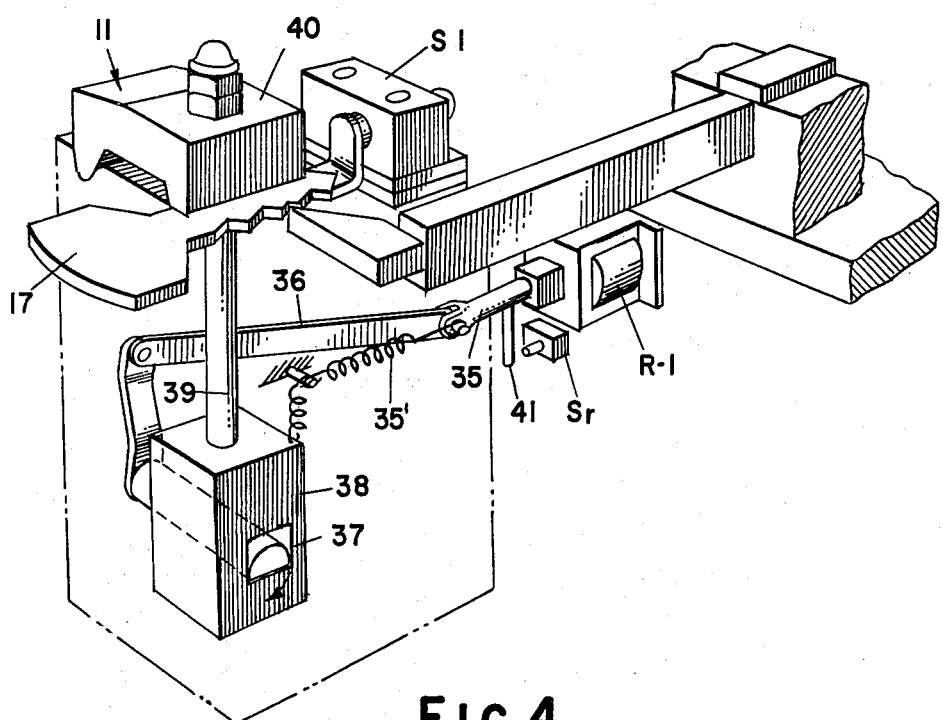
FIGURE 4 is an enlarged perspective view illustrating one of the key receiving and clamping means as used in the machine.

Referring now to FIGURE 4, there is shown in enlarged cut-away perspective view the key receiving and clamping means 11 for receiving the key 17 as described in conjunction with FIGURES 1 and 3. The key receiving and clamping means 12-16 of FIGURE 1 and the stationary clamping mechanism 34 shown in FIGURE 3 for holding the duplicate key 19 are all similar in structure and therefore description of the clamping structure 11 will suffice for all. As shown, there is provided a solenoid coil R-1 for operating a plunger 35 connected through connecting rod 36 to an eccentric cam mechanism 37 received within a block 38. The block 38, in turn, is connected through a column 39 to an upper clamp 40 as shown.

At the rear of the upper clamp 40 is a micro-switch S-1 arranged to be engaged by the tip of the key 17 when the same is inserted in the receiving means. The switch S-1 is connected to energize the solenoid R-1 so that when the key 17 is inserted and its end urged against the micro-switch S-1, the solenoid R-1 will be operated to pull inwardly the connecting rod 36 and rotate the cam member 37, thereby lowering the block 38 and head 40 to clamp the key 17 in a fixed position. A return spring 35' normally holds the clamp open when the solenoid is de-energized.

The plunger 35 of the solenoid includes a projection 41 for operating a micro-switch $S_r$ after the clamp is closed, the purpose for which will be clearer when the overall operation of the system is given.

Each of the additional key receiving means 12, 13, 14, 15, and 16, as stated, similarly includes a clamping structure operable by a corresponding solenoid coil and micro-switch, these coils and switches being designated R-2 to R-6 and S-2 to S-6, respectively, in FIGURE 11 to be described subsequently.

Referring to FIGURES 5, 6, 7, and 8, the manner in which an actual duplicate key is selected from the turret structure 18 and positioned in the stationary clamp 34 described in FIGURE 3 for proper cutting by the cutting wheel 27 will now be described.

Figure 5:
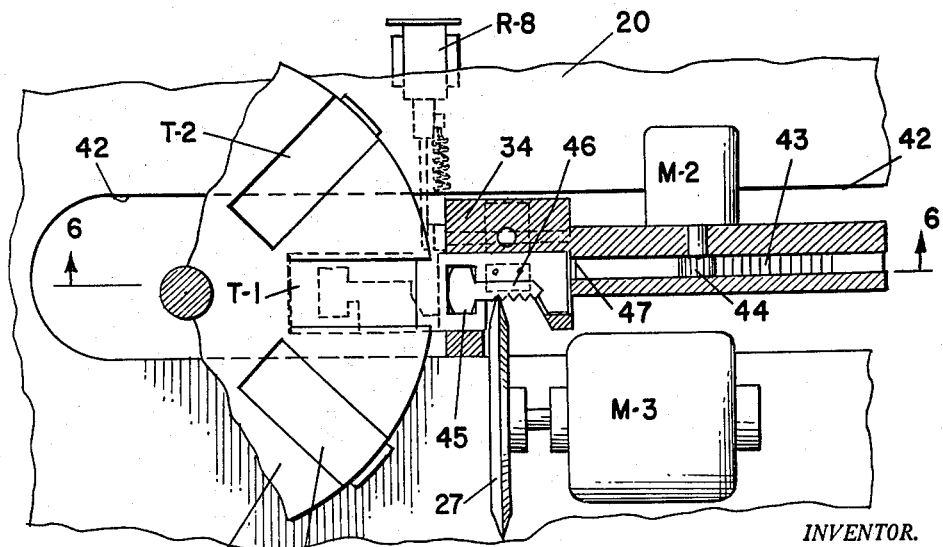
FIGURE 5 is a fragmentary plan view of a selecting slide means as incorporated in the machine.

In FIGURE 5, it will be noted that the table 20 is provided with an elongated U-shaped slot 42 through which the turret structure 18 is supported so that the table is free to move relative to the turret. Also supported through this slot is a selective slide means including a rack slide 43 driven by a pinion 44 connected to slide motor M-2. The selecting slide mechanism additionally includes a blank key holding member 45 having a cutout to expose one longitudinal edge of the key shaft for receiving the cutter wheel 27 on the motor M-3. To prevent the key blank from falling through the cutout, there is provided a small leaf spring 46 on the under side of the key holding member 45 as shown in the center portion of FIGURE 5 in dotted lines. The key holding member 45 is hooked to the left end of the rack slide 43 by a hook structure 47 which is arranged to engage the key holding member when the same is disposed in the turret compartment and slide a blank duplicate key from the compartment in a direction from left to right as viewed in FIGURE 5 to be in position for engagement by the clamp 34. A solenoid coil R-8 operates the clamp 34 in the same manner as the solenoid R-1 of FIGURE 4 operates the clamp 11.

Figure 6:
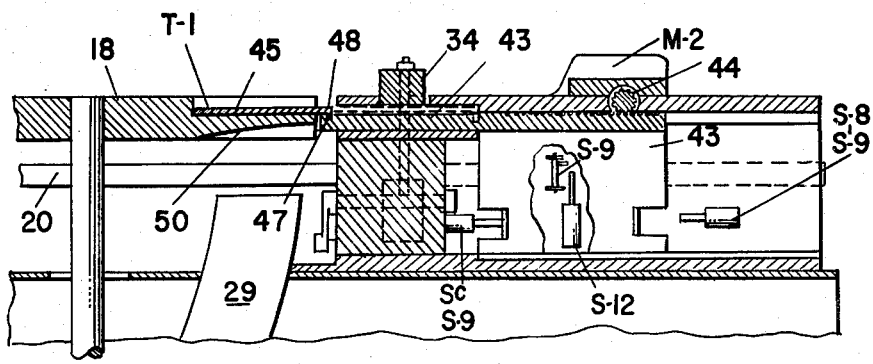
FIGURE 6 is a fragmentary cross section taken in the direction of the arrows 6—6 of FIGURE 5.
Figure 7:
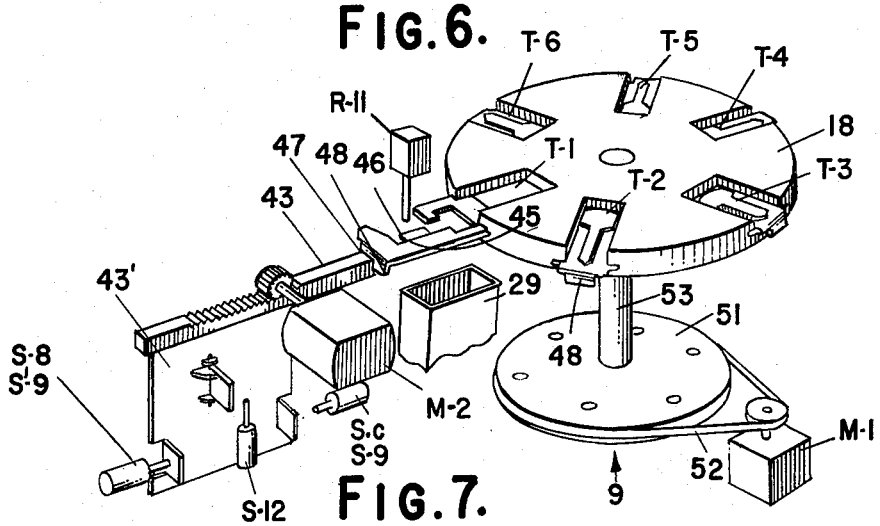
FIGURE 7 is a schematic perspective view of only certain components useful in explaining the operation of the selecting slide means.

In the cross section of FIGURE 6, taken in the direction of the arrows 6—6 of FIGURE 5, and in FIGURE 7, the hook 47 at the end of the slide rack 43 for engaging the key holding member 45 is more clearly illustrated.

As shown, the key holding member includes a front downwardly bent tab 48 which is received in the hook portion 47 when the turret 18 is rotated to bring the key holding member in the particular compartment of blank keys into juxtaposition to the rack slide structure 43.

In the perspective view of FIGURE 7, the key holding member 45 is shown partially withdrawn, there being omitted a duplicate key positioned therein for purposes of clarity.

As shown in both FIGURES 6 and 7, the selecting slide means includes a lower frame structure 43' projecting through the U-shaped slot opening 42 in the table 20 shown in FIGURE 5. This lower frame portion 43' moves with the rack and includes projecting means for engaging various micro-switches depending upon the particular position of the rack slide 43. Thus, in the solid line position illustrated in FIGURE 6, the frame structure 43, engages a dual micro-switch $S_c$ and S–9, the latter switch constituting a slide motor reversing switch for the motor M–2. When in its fully retracted position to the right, it will engage another dual micro-switch S–8 and motor reversing switch S'–9. In an intermediate position when moving from right to left, the frame 43' is caused to trigger a micro-switch S–12. S–12 is so designed that it will only be momentarily triggered when the frame srstructure 43' is moving from right to left and not when the frame structure is moving from left to right. The purpose for these various micro-switches will become clearer as the description proceeds.

Figure 8:
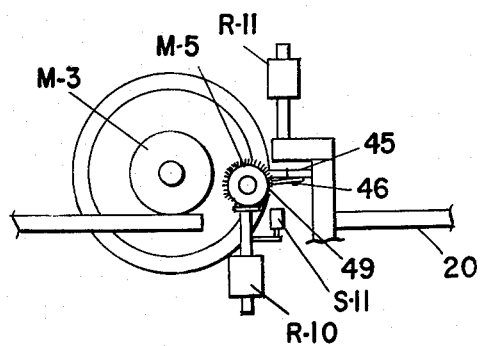
FIGURE 8 is another schematic view of some of the components employed in the machine for effecting a deburring operation.

In the enlarged schematic view of FIGURE 8, there is shown a raising solenoid R–10 for raising a deburring motor M–5 having a deburring wheel 49 thereon for effecting a burring operation on the duplicate key after the same has been formed. Associated with the deburring motor M–5 is a micro-switch S–11 adapted to be engaged when the motor M–5 is raised into operating position.

To facilitate ejection of the duplicate key, there is provided a solenoid R–11 for operating a plunger which will momentarily strike the key against the bias of the retaining spring 46 in the key holding member 45 so that the end of the key will project below the cutout in the key holding member 45. A chamfered cutout portion 50 beneath each of the compartments in the turret structure 18 is provided as shown in FIGURE 6 and will intercept the lowered key end to eject the key upon complete inward movement of the rack slide 43 and thus free the key to fall into the chute 29.

Figure 9:
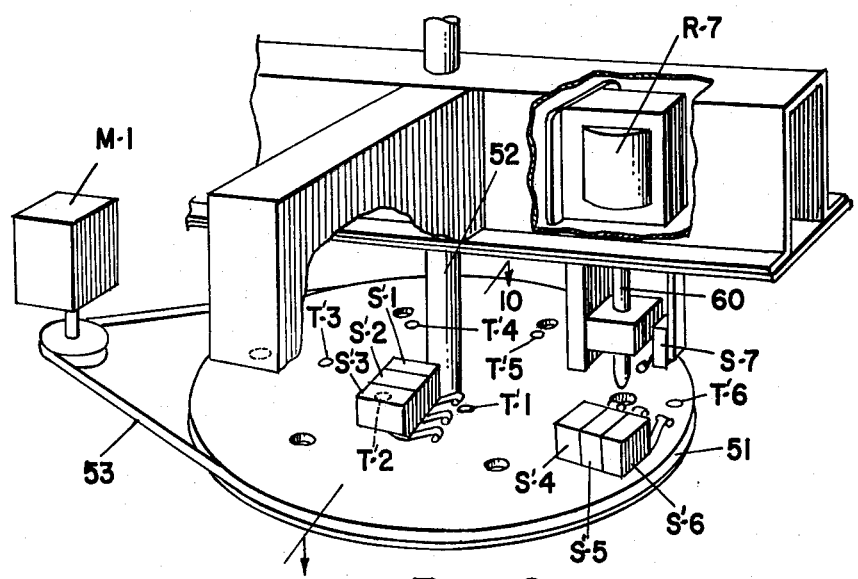
FIGURE 9 is a fragmentary perspective view taken in the direction of the arrow 9 in FIGURE 7 looking at the under side of a turret control means for enabling selection of different types of key blanks.
Figure 10:
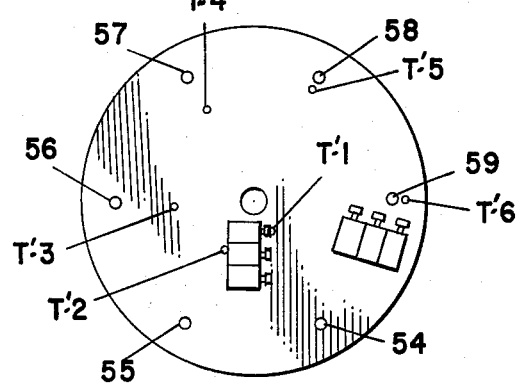
FIGURE 10 is a schematic plan view taken in the direction of the arrows 10—10 of FIGURE 9.

The manner in which the turret 18 is rotated and controlled to move a desired one of the compartments in juxtaposition to the selective slide means will be understood by now referring to FIGURES 9 and 10. FIGURE 9 is an underside view of the lower structure illustrated in FIGURE 7 wherein there is shown a turret drive motor M–1 connected to rotate a driving disc 51 by a bolt 52. The disc 51 includes a shaft 52 passing downwardly as viewed in FIGURE 9 or upwardly as viewed in FIGURE 7 to connect to the turret structure 18.

The operation of the motor M–1 is controlled by a series of micro-switches S'–1, S'–2, S'–3, S'–4, S'–5, and S'–6. These switches in turn are respectively connected in series with the key operated micro-switches S–1 through S–6 described in conjunction with FIGURE 4 for the switch S–1. The switches S'–1 through S'–6 are all normally closed except for one depending upon the particular position of the turret. Further, the various switches are all connected in parallel to operate the motor M–1. By such an arrangement, the motor M–1 will only be operated when a key is inserted to operate a particular key switch and the particular turret micro-switch in series therewith is closed.

With reference to the plan view of FIGURE 10, it will be noted that the driving disc 51 includes a plurality of openings designated T'–1, T'–2, T'–3, T'–4, T'–5, and T'–6. Each of these openings are disposed in vertical alignment with one of the various compartments in the turret 18 designated by the corresponding letters and numerals without the prime. Further, these openings are distributed circumferentially equally about the disc 51 but are radially spaced successively from the center thereof so that they will be respectively engaged by the turret micro-switches S'–1 through S'–6 as the turret rotates. When the particular micro-switch beneath the turret compartment from which a blank key is to be selected opens, operation of the turret motor M–1 will be terminated, thereby stopping rotation of the turret at a selected position.

To insure proper indexing, there are provided six indexing holes 54, 55, 56, 57, 58, and 59 as shown in FIGURE 10. These holes are arranged to receive an indexing plunger 60 operated by a solenoid R–7 which solenoid when energized holds the plunger 60 free of the index holes. The solenoid R–7 is connected to be operated only when the turret motor M–1 is operated so that it will always insure that the plunger 60 is free of the disc 51 when the motor M–1 is operated. On the other hand, when the motor M–1 is de-energized, the solenoid coil R–7 is de-energized and the plunger 60 is biased into one of the indexing holes.

Associated with the plunger 60 is a micro-switch S–7 arranged to be engaged when the plunger 60 moves into one of the indexing holes after the turret is properly positioned. The purpose for the micro-switch S–7 will become clearer when the operation of the system is described.

Figure 11:
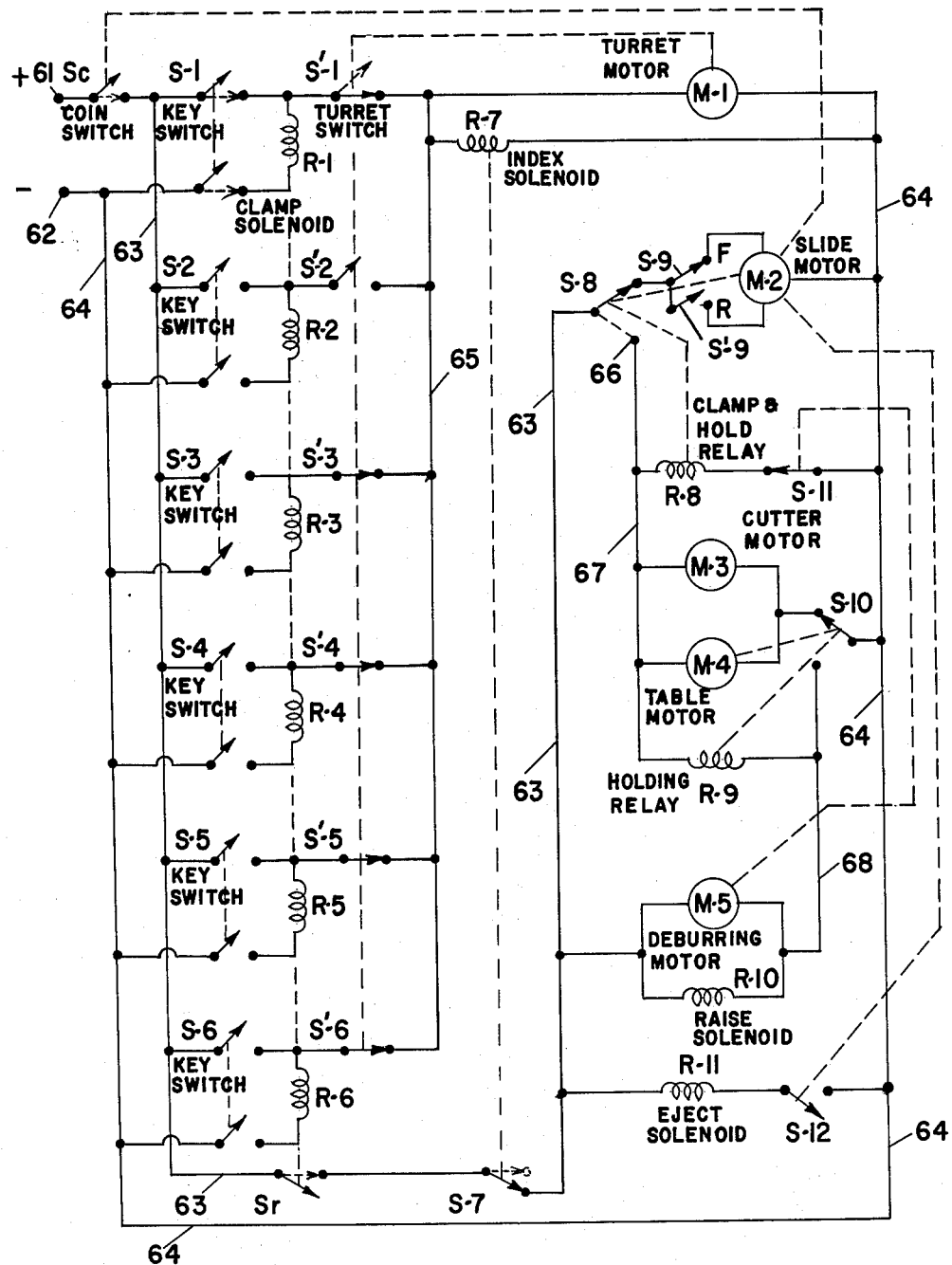
FIGURE 11 is a simplified schematic electrical circuit diagram useful in explaining the operation of the machine.

The connection of the various micro-switches described above as well as the various motors and other switches described in conjunction with FIGURES 1–8 will be better understood by reference to the electrical circuit diagram of FIGURE 11.

As shown at the upper lefthand corner, there are provided power input terminals 61 and 62. At the input terminal 61, there is provided a coin operated switch $S_c$. This switch is arranged to close upon receipt of a proper coin in the coin structure 28 of FIGURE 1. This same switch is arranged to be opened upon operation of the dual micro-switch $S_c$ and S–9 described in FIGURES 6 and 7 in response to completion of the movement of the rack slide 43 and frame structure 43'.

From the right of switch $S_c$ and input terminal 62, there are provided power lines 63 and 64 extending downwardly along the left end of FIGURE 11 as shown. These lines are connected across the clamping solenoids R–1, R–2, R–3, R–4, R–5, and R–6 through the key operated switches S–1 through S–6. Each of these key operated switches are double throw switches as shown.

The respective series connected turret micro-switches S'–1 through S'–6 are also shown in FIGURE 11, the particular turret micro-switch S'–2 being shown as open only as an example, indicating that the turret is in position for blank keys contained in compartment T–2 to be selected.

The power line 64 as shown extends across the bottom of FIGURE 11 and up the righthand side to one side of the turret motor M–1. The other side of the turret motor M–1 connects to a line 65 common to the righthand sides of the various turret switches S'–1 through S'–6. The indexing relay R–7 is connected across the lines 64 and 65 as shown so that it will be energized at any time that the motor M–1 is energized.

The other power line 63 also extending down the left side of FIGURE 11 passes through a series connected switch $S_r$ which is operable by any one of the solenoids R–1 through R–6 as schematically indicated by the dashed lines. This switch $S_r$ was described in FIGURE 4 as being operated in response to operation of the clamping control solenoid R–1 by the projecting arm 41.

In series with the switch $S_r$ is the micro-switch S–7 operated upon movement of the plunger 60 for the indexing solenoid R–7 described in FIGURE 9 so that when the solenoid R–7 is de-energized, the switch S–7 is closed and when the solenoid R–7 is energized to permit rotation of the turret, the switch S–7 is opened.

The power line 63 continues upwardly as shown and when energized by closure of both the switches $S_r$ and S–7 constitutes one power line cooperating with the power line 64 constituting the other power line for operating the remaining components in the system. Thus, the slide motor M–2 is shown connected between the lines 63 and 64 through the micro-switch S–8, and the reversing switch S–9. As described heretofore, when the slide motor M–2 is in its withdrawn or retracted position, it will strike one of the dual micro-switches including the switch S–8 to throw the same to a terminal 66 placing power from line 63 on line 67. This operation in turn will energize the stationary clamping solenoid or relay R–8 for operating clamp 34 to clamp the duplicate key in position. This coil also functions as a holding relay for the switch S–8 maintaining this switch on the terminal 66. The micro-switch S–11 is connected in series with the coil R–8 as shown.

The key cutting motor M–3 and table moving motor M–4 are both connected across the line 67 and line 64 through the micro-switch S–10. Both of these motors are simultaneously held de-energized during a certain portion of the operation by a holding relay R–9 functioning to hold the switch S–10 disconnected from the motors M–3 and M–4.

The movement of the switch S–10 to disconnect the motors M–3 and M–4 simultaneously places power from the line 64 on line 68 to energize the de-burring motor M–5 and raise solenoid R–10.

The circuit is completed by the ejecting solenoid R–11 in series with a control switch S–12 both connected between the lines 63 and 64 as shown. The switch S–12 constitutes the momentarily actuated switch described in conjunction with FIGURES 6 and 7 when the slide rack 43 is in an intermediate position and only moving from its fully retracted position towards the turret.

Various dashed lines in FIGURE 11 indicate that the various switches are operated by either solenoids or movements resulting from the operation of motors.

With the foregoing in mind the operation of the entire machine will now be described.

Referring to FIGURES 1–10 in conjunction with the circuit diagram of FIGURE 11, an operator will first select one of the various key receiving and clamping means 11–16 illustrated in FIGURE 1. The front of each of these receiving means on the housing (not shown) will be marked with a particular type of key blank. Assume that the customer desires to have a duplicate key formed from a key blank of the type designated for the key receiving means 11 in FIGURE 1. For example, this may correspond to General Motor's type automobile keys of which the customer desires a duplicate.

In the first step of the operation, the customer will therefore insert his key to be duplicated as shown at 17 in the first key receiving opening 11. Referring to FIGURE 4, insertion of the key 17 in this opening will cause its end to engage the micro-switch S–1. This switch is shown at the top of FIGURE 11 by the same symbol and insertion of the key will throw this switch to its dotted line position as shown. However, none of the equipment will be operated since the coin switch $S_c$ in the power line connecting to terminal 61 is still open.

Next the customer will insert a coin of proper denomination in the coin receiving structure 28 of FIGURE 1. Receipt of the coin in this structure will operate the switch $S_c$ shown in FIGURE 11 thereby connecting power across the clamping solenoid R–1 through the now closed switch S–1.

Referring once again to FIGURE 4, the solenoid R–1 upon energization will result in clamping of the key 17 under the head 40 as described heretofore and simultaneously motion of the plunger 35 will operate the switch $S_r$. Referring to FIGURE 11, it will be noted that at the same time the switch $S_r$ is caused to close, the indexing solenoid R–7 will be energized since the turret motor is assumed in a position, prior to insertion of key 17, in which the micro-switch S'–1 is closed. Operation of the indexing solenoid R–7 will immediately throw the switch S–7 shown in the bottom of FIGURE 11 open so that the closing of the switch $S_r$ will have no effect and no power will appear on the portion of the line 63 to the right of the switch S–7.

Also simultaneously energized with the indexing solenoid R–7 is the turret motor M–1 which will now rotate the turret until the micro-switch S'–1 is opened by its arm passing into the opening T'–1 in the disc 51. Thus, with particular reference to FIGURE 10, the turret in its position prior to insertion of the key would have its micro-switch S'–2 physically over the small hole T'–2 and thus open. Upon rotation of the turret, the switch S'–1 will be brought about to the position shown in FIGURE 10 in which it is opened by its arm passing into the opening T'–1.

Referring again to FIGURE 11, when the turret switch S'–1 is opened to the dotted line position shown, the turret motor and solenoid R–7 will be simultaneously de-energized and the indexing plunger shown in FIGURE 9 will move into the indexing hole 54 corresponding to the position in which the compartment T–1 is juxtaposed the selector slide mechanism.

Upon de-energization of the indexing solenoid R–7, the plunger will engage the micro-switch S–7 to close the same and now supply power to the portion of the line 63 to the right of the switch S–7. Energy on this line will immediately operate the slide motor M–2 through the switch S–8 and switch S–9 to the right power line 64.

Operation of the slide motor M–2 will cause movement of the key holding member 45 as shown in FIGURES 5 and 6 removing a blank duplicating key from the turret compartment T–1. When the slide has reached its fully retracted position, the micro-switch S–8 will be energized closing the same on the terminal 66 as shown in FIGURE 11, thereby immediately energizing the stationary clamping relay coil R–8 through the normally closed switch S–11. This solenoid coil R–8 is arranged to hold the switch S–8 closed on the terminal 66 and also operate the clamp mechanism to hold the selected duplicate key blank in the clamp 34. It should be noted that when the switch S–8 is removed to the terminal 66, the slide motor M–2 is de-energized and simultaneously with the operation of the switch S–8, the switch S–9 is thrown open from F and switch S'–9 thrown to the reverse terminal R.

With power on the line 67, both the cutter motor and table motor M–3 and M–4 will be simultaneously energized through the closed switch S–10 thereby resulting in a cutting operation on the duplicate key blank. With reference to FIGURE 2, the operation of the table motor M–4 will rotate the wheel 30 to move the eccentrically connected rod 31 through one complete revolution. This action moves the table over the length of the shaft of the duplicate key blank in an aft and fore direction until the eccentrically connected rod reaches its initial position at which time it engages the micro-switch S–10.

Referring once again to FIGURE 11, actuation of the switch S–10 momentarily by the eccentrically connected rod throws it to connect the holding relay S–9 to the power line 64. This relay will hold S–10 in its new position so that the cutter motor and table motor M–3 and M–4 are both de-energized. It will also be clear that when the switch S–10 energizes the relay R–9, it connects the power line 64 through the lead 68 to the burr motor M–5 and raise solenoid R–10 and back to the line 63. The raise solenoid R–10 will raise the burr motor M–5 as described in conjunction with FIGURE 8 and effect a single burring operation on the key.

The raising of the burr motor M–5 in turn actuates the micro-switch S–11 momentarily thereby de-energizing the relay coil R–8 shown in FIGURE 11. De-energization of the coil R–8 results in return of the switch S–8 to its solid line position, thereby removing energy from line 67. With energy removed from line 67, the holding relay R–9 is de-energizing, permitting switch S–10 to return to its original position connecting to the table and cutter motors, but since line 67 is de-energized, these motors will not operate. The movement of switch S–10 removes power from the burr motor and raise solenoid to permit them to return to their initial positions. The inertia of rotation of the burr motor as a consequence of its momentary starting is sufficient for the particular burring operation involved.

With the clamp and holding relay R–8 de-energized, the clamp 34 will be released. Also, return of the switch S–3 from the terminal 66 to its solid line position energizes the slide motor M–2 but in a reverse direction because of the removal of the switch S–9 and new position of S'–9. The slide motor will then slide the rack slide 43 back towards the turret structure. During this movement towards the turret structure, the micro-switch S–12 described in FIGURES 7 and 8 will be momentarily engaged to energize the eject solenoid R–11 shown in the lower righthand portion of FIGURE 11. This eject solenoid will then engage the duplicate key as described to push it against the bias of the leaf spring 46 so that its inner end will engage under the chamfered portion 50 of the turret and the key will be ejected upon complete return of the slide mechanism towards the turret. The key as described heretofore will then fall within the chute 29 and be delivered to the customer.

When the slide motor M–2 completes movement of the slide mechanism to its position juxtaposed the turret, it will engage the dual micro-switch S'–9 and $S_c$. The switch S'–9 opens and switches S–9 back to the terminal F and the operation of the switch $S_c$ releases the coin in the coin mechanism to the coin collection box and permits the switch $S_c$ to open.

When the switch $S_c$ opens, the entire circuit is de-energized and the clamp relay R–1 is thus de-energized to permit the customer to remove the key inserted within the receiving clamp means 11. When the key is removed, the key switch S–1 is then free to open and the various switches are thus all in their original positions.

In the event that the turret happens to be in the proper position for a desired type of blank duplicate key, the corresponding turret switch S'–1 through S'–6 will already be open. Thus, if it be supposed that the customer inserted his key in the key receiving and clamping means 12 to initially close the key switch S–2 as shown in FIGURE 11, the fact that the turret switch S'–2 was open would prevent any energy from being passed to the turret motor or the indexing solenoid R–7. Energization of the first clamping relay R–2, however, would immediately close the switch $S_r$ and since the switch S–7 is already closed, energy would be supplied immediately to the slide motor so that there would be no delay in operation of the machine.

While only one particular embodiment of the invention has been set forth and described, it will be evident that many changes and modifications can be effected without departing from the scope and spirit of the invention. For example, the key duplicating machine may be considerably simplified by adapting it to duplicate only one type of key blank. In this instance, the entire turret structure could be removed, and all that would be required would be a simple compartment holding the particular key types in question. Further, there would then be necessary only one key receiving and clamping means in the front of the machine. The provision of the turret structure together with a plurality of receiving and clamping means for different types of keys, however, provides a far more versatile machine.

The invention, accordingly, is not to be thought of as limited to the one particular embodiment set forth and described merely for illustrative purposes.

What is claimed is:

1. A key duplicating machine comprising, in combination:
   key receiving means for receiving a key of which a duplicate is to be made; and,
   key forming means including selecting means responsive to the form of said key received in said key receiving means to select a key blank and automatically form a duplicate key from said key blank.

2. A machine according to claim 1, in which said key forming means is automatically actuated in response to reception of said key in said key receiving means.

3. A machine according to claim 1, including a coin receiving means, said key forming means being automatically actuated only in response to reception of a coin in said coin receiving means and reception of a key in said key receiving means.

4. A machine according to claim 1, including:
   storage means for storing a plurality of different types of key blanks, said
   selecting means automatically selecting a key blank of the type from which the key received in said key receiving means is made.

5. A key duplicating machine, comprising, in combination:
   key receiving means for receiving and clamping a key of which a duplicate is to be made;
   key cutting motor means;
   clamping means for clamping a duplicate key blank in a position adjacent to said key cutting motor means;
   a control stylus positioned to engage said key in said key receiving means;
   mounting means enabling relative motion between said stylus and said key receiving means to take place, said mounting means effecting identical relative motion between said key cutting motor means and said clamping means; and,
   automatic means for actuating said clamping means, key cutting motor means, and mounting means after a key has been received in said key receiving means to cause said stylus to follow the indentations in said key received in said key receiving means and through said mounting means to effect cutting of identical indentations in said duplicate key blank.

6. A machine according to claim 5, in which said automatic means is responsive to reception of a key in said key receiving means to actuate said clamping means, key cutting motor means, and mounting means.

7. A machine according to claim 5, including a coin receiving means, said automatic means being actuated only in response to reception of a coin in said coin receiving means and reception of a key in said key receiving means.

8. A machine according to claim 5, including a source of duplicate key blanks; selecting means for selecting and moving one of said duplicate key blanks to a position to be engaged by said clamping means, said source of duplicate key blanks including:
   a turret structure having a number of individual storing compartments for a number of groups of different type key blanks, respectively, said machine including additional individual key receiving means; and,
   rotating means for rotating said turret to position one of said groups for cooperation with said selecting means, said rotating means being responsive to the particular one of said key receiving means within which a key is positioned so that the selecting means selects the same type of key as that received in said particular one of said key receiving means.

9. A key duplicating machine comprising, in combination:
   a frame structure;
   key receiving means secured to said frame structure for receiving and clamping a key of which a duplicate is to be made;

a source of duplicate key blanks supported by said frame structure;

a movable table;

carriage means mounting said table for aft and fore movement;

means mounting said carriage means to said frame structure for transverse movement;

a key cutting motor means secured to said table;

selecting slide means mounted to said structure for selecting and positioning one of said duplicate key blanks;

stationary clamping means for clamping said one of said duplicate key blanks in a stationary position relative to said table and key cutting motor means after positioning thereof by said selecting slide means;

a control stylus secured to said table for movement therewith, said table being transversely biased to urge said stylus into engagement with the indentations in said key in said key receiving means;

table moving motor means secured to said carriage means for moving said table and key cutting motor means in an aft and fore direction relative to said carriage means;

means responsive to reception of a key in said key receiving means for operating said selecting slide means to select one of said duplicate key blanks;

means responsive to positioning of said one of said duplicate key blanks by said selecting slide means for operating said stationary clamping means;

means responsive to operation of said stationary clamping means for starting said key cutting motor means and said table moving motor means to move said stylus over the length of said key in said key receiving means so that said key cutting motor means forms identical indentations in said one of said duplicate key blanks while secured in said stationary clamping means;

means responsive to completion of one aft and fore movement of said table moving motor for turning off said key cutting motor means, releasing said stationary clamping means, and re-actuating said selecting slide means;

means responsive to complete return of said selecting slide means to its original position to terminate its operation;

means responsive to return movement of said selecting slide means for ejecting said one of said duplicate key blanks from said selecting slide means; and, chute means for receiving said ejected key.

10. A machine according to claim 9, in which said means responsive to completion of said aft and fore movement of said table moving motor includes:

a movable deburring means for removing burrs from said one of said duplicate key blanks upon movement thereagainst; and, means responsive to completion of movement of said deburring means for terminating its operation and effecting the releasing of said stationary clamping means and reactuating of said selecting slide means.

11. A machine according to claim 9, in which said source of duplicate key blanks includes:

a turret structure having a number of individual storing compartments for a number of groups of different type key blanks, respectively, said machine including:

additional individual key receiving means; and, rotating means for rotating said turret to position one of said groups for cooperation with said selecting slide means, said rotating means being responsive to the particular one of said key receiving means within which a key is positioned so that the selecting slide means selects a key of the same type as that received in said particular one of said key receiving means.

12. A machine according to claim 9, including a coin receiving means, said means responsive to reception of a key in said key receiving means for operating said selecting slide means being rendered inoperative until a coin is received in said coin receiving means.

References Cited in the file of this patent
UNITED STATES PATENTS
2,148,667     Yoskowitz et al. _____ Feb. 28, 1939